United States Patent [19]

Fuener et al.

[11] 3,792,889

[45] Feb. 19, 1974

[54] SHIFTABLE BUMPER SEQUENTIALLY MOVING VEHICLE GRILLE

[75] Inventors: Thomas W. Fuener; Thomas F. Girvin, both of Lansing; Robert D. Tower, Grand Ledge; Charles J. Zarka, St. Johns, all of Mich.

[73] Assignee: General Motors Corporation, Detroit, Mich.

[22] Filed: Sept. 21, 1972

[21] Appl. No.: 290,979

[52] U.S. Cl. .................. 293/63, 180/68 P, 293/64, 293/73, 296/28 R
[51] Int. Cl.... B60r 19/02, B61f 19/04, B62d 27/04
[58] Field of Search... 180/68 P; 293/63, 64, 65, 66, 293/67, 73, 74; 296/28 R

[56] References Cited
UNITED STATES PATENTS

| | | | |
|---|---|---|---|
| 1,871,331 | 8/1932 | Masury | 293/63 |
| 2,074,469 | 3/1937 | Haynes | 293/63 |
| 2,206,023 | 7/1940 | Broadwell | 293/66 |
| 2,905,286 | 9/1959 | Adams et al. | 293/63 X |
| 3,068,039 | 12/1962 | Barengi | 293/63 X |
| 3,529,861 | 9/1970 | Deroubaix | 293/63 |

FOREIGN PATENTS OR APPLICATIONS

| 642,237 | 5/1928 | France | 293/63 |
|---|---|---|---|

Primary Examiner—Gerald M. Forlenza
Assistant Examiner—Howard Beltran
Attorney, Agent, or Firm—Herbert Furman

[57] ABSTRACT

A vehicle includes a front grille mounted for longitudinal movement relative to the vehicle by pivotally securing a lower edge portion of the grille to the vehicle body or frame about a transverse vehicle axis located rearward of an energy absorbing bumper. The upper edge portion of the grille includes a pair of apertured flanges which respectively receive a pair of vehicle body mounted bolts to guide the grille during pivotal movement thereof about its lower edge portion. A pair of helical springs respectively encircle the bolts and seat against the flanges to bias the grille to a forward position where the grille is located just rearward of the bumper. When the bumper moves rearwardly to absorb energy upon impact with an obstacle, it sequentially engages the grille and pivots the grille rearwardly. The bolts guide the upper edge of the grille as it moves rearwardly and the springs are compressed by this movement. Upon subsequent forward movement of the bumper for reuse, the spring bias likewise moves the grille forward for reuse.

8 Claims, 3 Drawing Figures

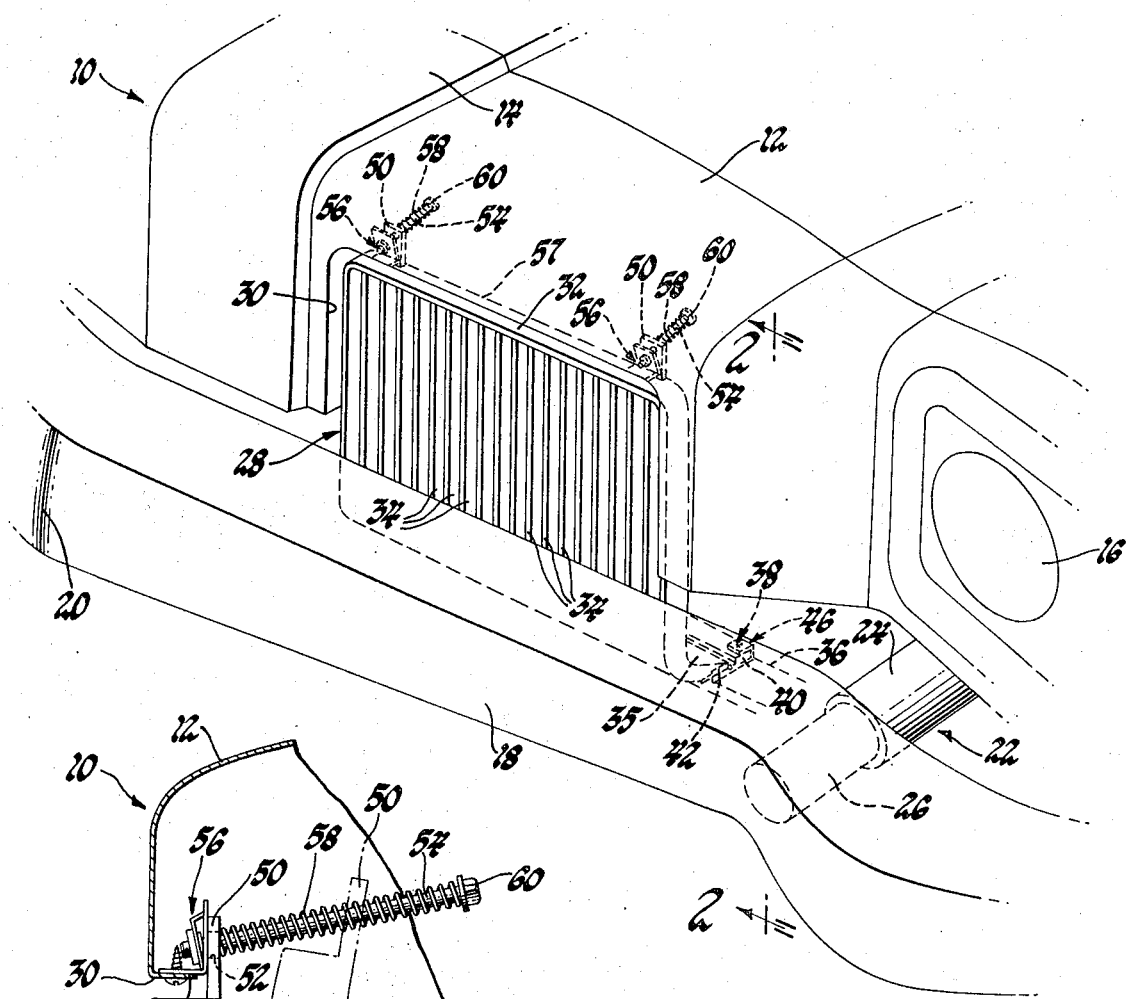
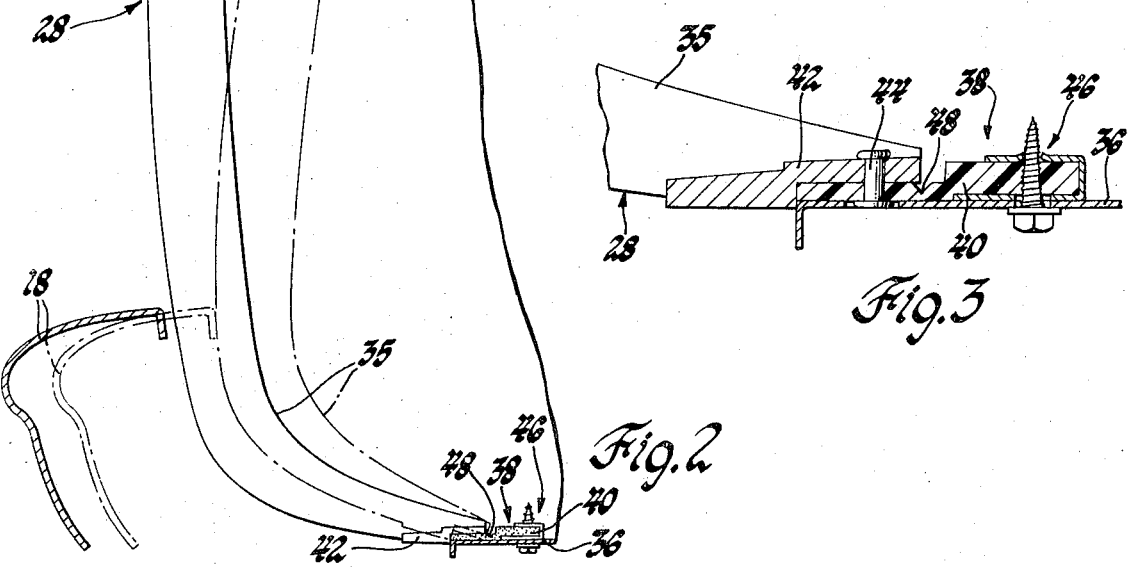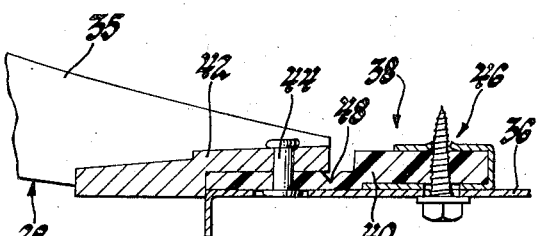

SHIFTABLE BUMPER SEQUENTIALLY MOVING VEHICLE GRILLE

BACKGROUND OF THE INVENTION

This invention relates to a vehicle grille for a vehicle including an energy absorbing bumper.

It is known to provide vehicles with front and/or rear bumpers that are mounted in a manner providing energy absorbing movement upon impact of the bumpers with an obstacle. During this energy absorbing movement, the bumpers move in a retracting direction relative to the vehicle. The retracting direction is rearward relative to the vehicle for front bumpers and forward for rear bumpers. It is also known to adapt this type of bumper for movement from its retracted position in an extending direction so as to allow the bumper to be reused subsequent to the impact. Any vehicle grille or vehicle body member adjacent the grille heretofore necessarily had to be located inward relative to the vehicle sufficiently far so as to prevent engagement of the bumper with the grille or body member as the bumper retracts inwardly and absorbs energy. If this stricture was not complied with, permanent deformation of the grille or body member would result as it was engaged by the retracting bumper. However, it may be desirable to normally locate the grille or body member generally adjacent the bumper to provide the vehicle with an aesthetically appealing appearance.

SUMMARY OF THE INVENTION

One feature of this invention is that it provides a vehicle including a grille or body member mounted for movement between inner and outer positions relative to the vehicle and normally maintained in the outer position adjacent an energy absorbing bumper which engages and moves it inwardly during retracting energy absorbing movement of the bumper such that the grille or body member is subsequently movable outwardly for reuse upon subsequent outward extending movement of the bumper for reuse. Another feature of the invention is that the grille or body member is maintained in the outer position by a resilient bias which moves it outwardly for reuse upon outward movement of the bumper subsequent to impact. Another feature of the invention is that this movement of the grille or body member is guided by an elongated guide mounted on the vehicle body and received within an aperture in the grille or body member, and a helical spring encircling the elongated guide provides the resilient bias for maintaining the grille or body member in its outer position. Another feature of the invention is that the lower edge of the grille or body member is pivoted to the vehicle frame or body about a generally transverse vehicle axis and its upper edge is secured to the vehicle body by a pair of these elongated guide and helical spring arrangements.

BRIEF DESCRIPTION OF THE DRAWINGS

The above detailed features and other features of this invention are readily apparent from the following description of the preferred embodiment and the drawings in which:

FIG. 1 is a perspective view of the front portion of a vehicle which includes an energy absorbing bumper and a grille that are cooperable in a manner according to this invention;

FIG. 2 is a sectional view taken generally along line 2—2 of FIG. 1 and illustrates the manner in which the grille is mounted for movement between the solid line indicated outer position and the phantom line indicated inner position so as to allow the grille to be reused subsequent to inward grille movement upon engagement of the grille by the bumper as the bumper retracts inwardly to absorb energy; and FIG. 3 is an enlarged view of a portion of FIG. 2 which shows the manner in which the lower edge of the grille is pivotally supported by a flexible strap hinge.

DESCRIPTION OF THE PREFERRED EMBODIMENT

Referring to FIG. 1 of the drawings, a vehicle generally indicated by 10 includes a front vehicle body panel 12 located forward of the vehicle engine compartment panel. Body panel 12 extends laterally of the vehicle and has a raised portion 14 at its inboard end adjacent the longitudinal center line of the vehicle. Adjacent its outboard end, this body panel supports a headlight 16. A front bumper generally indicated by 18 has a slightly pointed configuration with an apex portion 20 located adjacent the center portion of the vehicle, and with each of its outboard ends supported by a respective energy absorbing arrangement 22, only the left-hand one of which is shown. Each of these arrangements includes a vehicle body mounted tubular member 24 which receives a bumper mounted cylindrical member 26 in a telescoping manner. The members 24 and 26 are normally maintained in an extended position relative to each other to position the bumper in the position shown by FIG. 1. Upon impact of the bumper 18 with an obstacle, the bumper moves rearwardly and cylindrical member 26 retracts to within tubular member 24. A suitable energy absorbing mechanism between these two telescoping components of the arrangement provides energy absorption during this retracting bumper movement and thus dissipates the energy of the impact. This energy absorbing mechanism may be like any of a number of well known mechanisms of this type, one of which is disclosed by the copending United States patent application of Robert E. Tuggle, Ser. No. 171,238, filed Aug. 12, 1971, and assigned to the assignee of the present invention.

A front vehicle grille, according to this invention and indicated generally by 28, is normally received within a downwardly opening aperture 30 in vehicle body panel 12. The outer periphery of the grille 28 is bounded by a grille support member 32 of a generally rectangular configuration and a number of grille blades 34 extend vertically between the upper and lower edges of the support member. The lower edge portion of grille 28 has a rearwardly extending leg 35 which terminates adjacent a vehicle frame or body member indicated by 36. A flexible hinge arrangement indicated generally by 38, see also FIGS. 2 and 3, pivotally supports the grille on the body for movement about an axis that extends generally parallel to the adjacent portion of the bumper 18. This axis is located further forward at the inboard portion of the grille than at the outboard portion, but is located generally in a transverse orientation relative to the vehicle 10. The hinge arrangement 38 provides the pivotal support of the grille by way of a hinge element 40 composed of a suitable flexible material. The hinge element 40 is secured to a mounting flange 42 on leg 35 of the grille by way of rivets 44 and to the frame or body member 36 by a screw and bracket arrangement 46. A V-shaped slot or groove 48 in the hinge element 40 controls the location of the axis of pivotal movement of the grille.

The upper end of the grille includes a pair of flanges 50 located at the lateral sides of this portion of the grille. Each flange 50 includes a suitable aperture 52, see FIG. 2, for receiving a respective vehicle body mounted bolt 54. Suitable nut and bracket arrangements 56 mount the bolts 54 on the vehicle extending rearwardly from a flange 57 of the vehicle body panel 12 which defines the upper edge of the downwardly opening aperture 30. A pair of helical springs 58 respectively encircle the bolts 54 and have their rearward ends seated against integral washer head portions 60 of the bolts. The forward ends of these springs seat on the rear sides of the flanges 50 on the grille and normally bias the grille forwardly to the solid line indicated position of FIG. 2 where flanges 50 engage the rear sides of the brackets of nut and bracket arrangements 56 to thus position the grille.

When the bumper 18 is located in its normal forward position, the grille 28 is located just rearward of the bumper such that retracting bumper movement providing energy absorption causes the bumper to engage the grille and pivot the grille rearwardly about hinge arrangement 38 to its phantom line indicated position shown in FIG. 2. The bolts 54 guide the grille during this pivotal movement to prevent lateral movement of the upper end of the grille along the axis of the movement, and the helical springs 58 are compressed between the washer head portions 60 of the bolts and the rearwardly moving flanges 50 of the grille. This spring compression provides a resilient bias tending to move the grille 28 back toward its forward position, and causes the grille to move back to its forward position when the bumper 18 is subsequently moved forward for reuse. Thus, the grille 28 can be supported generally adjacent the bumper 18 to provide an aesthetically appealing appearance but can nevertheless be reused once the vehicle is subjected to an impact, and the forward grille movement for reuse occurs without any deliberate effort on the part of the person who moves the bumper forward for reuse.

It is, of course, apparent that a like grille 28 is supported on the other side of the vehicle in a symmetrical manner about the center line of the vehicle to provide a symmetrical front grille arrangement. It is also apparent that this type of arrangement is suitable for other types of vehicle body panels which are supported adjacent energy absorbing bumpers and may be useful for application with a rear energy absorbing bumper of a vehicle. Likewise, it is apparent that the bolts for guiding the grille may be fixed on the grille and slidably received by portions of the vehicle body in a reverse manner to the manner herein shown.

What is claimed is:

1. In a vehicle including a bumper movable from an extended position to a retracted position relative to the vehicle in order to absorb energy and movable back to the extended position for reuse, the combination comprising, a vehicle body member for defining a portion of the outer confines of the vehicle, means mounting the member on the vehicle adjacent the bumper for movement between inner and outer positions relative to the vehicle, and positioning means normally maintaining the member in the outer position where the member is located in the path of the bumper moving from extended position toward retracted position, the positioning means allowing inward movement of the member relative to the vehicle under the impetus of the bumper moving toward retracted position such that the member can be returned to its outer position for reuse upon subsequent return movement of the bumper to extended position.

2. In a vehicle including a bumper movable from an extended position to a retracted position relative to the vehicle in order to absorb energy and movable back to the extended position for reuse, the combination comprising, a vehicle body member for defining a portion of the outer confines of the vehicle, means mounting the member on the vehicle adjacent the bumper for movement between inner and outer positions relative to the vehicle, and resilient means normally positioning the member in the outer position where the member is located in the path of the bumper moving from extended position toward retracted position, the resilient means deforming to allow inward movement of the member relative to the vehicle under the impetus of the bumper moving toward retracted position such that the member is subsequently returned to the outer position for reuse by the resilient means upon subsequent return movement of the bumper to extended position.

3. In a vehicle including a bumper movable from an extended position to a retracted position relative to the vehicle in order to absorb energy and movable back to the extended position for reuse, the combination comprising, a vehicle body member for defining a portion of the outer confines of the vehicle and including upper and lower edge portions extending generally laterally of the vehicle, means pivotally securing one of said edge portions of the member to the vehicle to support the member for movement between inner and outer positions relative to the vehicle, a guide extending between the vehicle body and the other edge portion of the member so as to guide the member during movement between its inner and outer positions, and resilient means normally positioning the member in its outer position where the member is located in the path of the bumper moving from extended position toward retracted position, the resilient means deforming to allow inward movement of the member relative to the vehicle under the impetus of the bumper moving toward retracted position such that the member is subsequently returned to the outer position by the resilient means upon subsequent return movement of the bumper to extended position.

4. In a vehicle including a bumper movable from an extended position to a retracted position relative to the vehicle in order to absorb energy and movable back to the extended position for reuse, the combination comprising, a vehicle body member for defining a portion of the outer confines of the vehicle and including upper and lower edge portions extending generally laterally of the vehicle, means pivotally securing one of said edge portions of the member to the vehicle to support the member for movement between inner and outer positions relative to the vehicle, an elongated guide extending between the vehicle body and the other edge portion of the member so as to guide the member during movement between its inner and outer positions, and a helical spring encircling the elongated guide and seating against the member so as to bias the member to its outer position where the member is located in the path of the bumper moving from extended position toward retracted position, the spring deforming to allow inward movement of the member relative to the vehicle under the impetus of the bumper moving toward retracted position such that the member is subsequently returned to the outer position by the spring bias upon subsequent return movement of the bumper to extended position.

5. The combination of claim 4 wherein the spring is compressed during deformation thereof under the impetus of the bumper moving toward retracted position.

6. The combination of claim 4 wherein the elongated guide has one of its ends fixed on the vehicle and wherein the vehicle body member slidably receives the guide.

7. The combination of claim 4 wherein the lower edge portion of the vehicle body member is pivotally secured to the vehicle body by a flexible hinge element extending between the member and the vehicle body.

8. The combination of claim 7 wherein the flexible hinge element includes a groove controlling the location of the axis of pivotal movement of the vehicle body member.

* * * * *